United States Patent [19]

Boyd et al.

[11] Patent Number: 5,824,226
[45] Date of Patent: Oct. 20, 1998

[54] SILANE-MODIFIED CLAY

[75] Inventors: Mary K. Boyd, Evanston; G. Robert Goss, Quincy, both of Ill.

[73] Assignee: Loyola University of Chicago, Chicago, Ill.

[21] Appl. No.: 789,070

[22] Filed: Feb. 3, 1997

Related U.S. Application Data

[62] Division of Ser. No. 360,311, Dec. 21, 1994, abandoned.
[51] Int. Cl.$^6$ .................................................... B01D 15/00
[52] U.S. Cl. ............................................ 210/679; 210/691
[58] Field of Search .................................... 210/690, 691, 210/679

[56] References Cited

U.S. PATENT DOCUMENTS

| | | | |
|---|---|---|---|
| 3,725,302 | 4/1973 | Shimely et al. | 252/431 R |
| 4,517,094 | 5/1985 | Beall | 210/664 |
| 5,151,155 | 9/1992 | Cody et al. | 162/5 |
| 5,292,908 | 3/1994 | Onikata et al. | 556/173 |

FOREIGN PATENT DOCUMENTS

| | | | |
|---|---|---|---|
| 2 550 542 A1 | 2/1985 | France | C09K 3/32 |
| 2 103 196 | 2/1983 | United Kingdom . | |
| 2 131 822 | 6/1984 | United Kingdom . | |
| WO 83/01205 | 4/1983 | WIPO | B01D 15/00 |

OTHER PUBLICATIONS

Boyd et al., Nature 333:345–347 (1988).
Boyd et al. in "Role of Layer Change in Organic Contaminant Sorption by Organo–Clays," Clay Minerals Society Pre–Meeting Workshop on the Layer Change Characteristics of Clays, Saskatoon, Sask. CA (1992).
Chladek et al., J. Chrom. Sci. 22:313–320 (1984).
Hagen et al., Anal. Chim. Acta 236:157–164 (1990).
Hutta et al., J. Chrom. 470;223–233 (1989).
Junk et al., Anal. Chem. 60:451–454 (1988).
Lee et al., Environ. Sci & Tech. 23:1365–1372 (1989).
Lee et al., J. Chem. Soc., Far. Trans 85(9):2953–2962 (1989).
Lee et al., Clays & Clay Min. 38(2):113–120 (1990).
Plueddemann, *Silane Coupling Agents*, 2nd ed., Plenum Press, NY (1991), pp. 8 and 187–188.
Poole & Poole, *Chromatography Today*, Elsevier Pub. Co., New York, N.Y. (1991), pp. 313–338.

*Primary Examiner*—Steven Bos
*Assistant Examiner*—Thomas G. Dunn, Jr.
*Attorney, Agent, or Firm*—Olson & Hierl, Ltd.

[57] ABSTRACT

Clay particles with organo silane-modified surfaces are provided along with a process for their preparation. The silane-modified clay is relatively easily and reliably produced by reacting clay with a R-substituted halosilane (R being a hydrophobic group) in a polar solvent containing a tertiary amine. The produced silanized clay is stable over a wide range of storage and use conditions. Contacting processes for using the silane-modified clay to remove organic contaminants from aqueous media are also provided. After use, the silane-modified clay particles can be regenerated, treated and reused for such contaminant removal.

10 Claims, 3 Drawing Sheets

SILANE-MODIFIED CLAY

This application is a division of application Ser. No. 08/360,311, filed Dec. 21, 1994, now abandoned.

FIELD OF THE INVENTION

This invention lies in the field of alkyl silyl modified clays and in the usage of such silane-modified clays to remove contaminants from aqueous media.

BACKGROUND OF THE INVENTION

Clays have long been used as sorbents (either absorbents or adsorbents). Recently, clays have been modified by intercalation of quaternary ammonium compounds, and the resulting clays have been used for the removal of organic compounds from aqueous solutions; see Boyd et al. in "Role of Layer Charge in Organic Contaminant Sorption by Organo-Clays," Clay Minerals Society Pre-Meeting Workshop on the Layer Charge Characteristics of Clays, Minneapolis, Minn. (1992) and Lee et al., Environ. Sci. & Tech. 23:1365–1372 (1989), J. Chem. Soc., Far. Trans. 85(9):2953–2962 (1989), and Lee et al., Clays & Clay Min. 38(2):113–120 (1990).

Clays have been modified with silane coupling agents and used to benefit polymer compositions, Plueddeman, *Silane Coupling Agents*, 2nd ed., Plenum Press, NY (1991), pages 8 and 187–188.

Soils have been treated with quaternary amines which intercalate in the clay fraction. The resulting treated soils immobilize or sorb organic contaminants; see Boyd et al., Nature 333:245–347 (1988).

Silicas, such as silica gel, precipitated silicas, glass and diatomaceous earth, have been silanated and used in chromatography and in solid phase extraction from aqueous solutions, Poole & Poole, *Chromatography Today*, Elsevier Pub. Co., New York, N.Y. (1991), pages 313–338; Hagen et al., Anal. Chim. Acta 236:157–164 (1990), Hutta et al., J. Chrom. 470:223–233 (1989), Chladek et al. J. Chrom. Sci. 22:313–320 (1984), and Junk et al., Anal. Chem. 60: 451–454 (1988).

However, so far as now known, no one has heretofore either prepared hydrophobic particulate alkyl silyl modified clays, or used such modified clays to decontaminate aqueous media containing organic or inorganic material by sorption.

SUMMARY OF THE INVENTION

In one aspect, this invention relates to a new and very useful silane-modified clay having a volatile matter content of no more than about 15 percent and a porosity of at least about 0.3 milliliters per gram. Preferably, the clay particle size is less than about 850 microns.

R-silyl groups are bonded to the surfaces of the clay particles. The quantity of the R-silyl groups that is bonded to the R-silyl modified clay particles is sufficient to render the clay particles hydrophobic. Preferably the amount of R-silyl groups present on the clay is at least about 2 weight percent, based on the total weight of the silane-modified clay, more preferably at least about 5 weight percent. R is a hydrophobic group containing up to 30 carbon atoms, preferably a member of the group consisting of alkyl, aryl, alkaryl, cycloalkyl, alkenyl, alkynyl, cycloalkenyl, cycloalkynyl, alkenylaryl and alkynylaryl.

In another aspect, this invention relates to a process for making such silane-modified clays. In accord with this process, a starting clay that has porosity and volatile matter characteristics as above indicated, and that is preferably free of bound water, is contacted in an organic polar solvent with a halosilane bearing an R group in the presence of an acyclic or cyclic tertiary amine salt forming catalyst. The contacting is preferably carried out at an elevated temperature under liquid phase conditions. The silane compound reacts with surface hydroxyl groups on the clay particles to introduce R-silyl substituents onto the clay particle surfaces. The product clay is separated, washed and dried. Alternatively, the R-silyl substituted clays of this invention can also be made from silane ethers.

In another aspect, this invention relates to methods for removing organic contaminants from aqueous liquid media by contacting such media with a particulate, silane-modified clay of this invention.

The R-silyl modified clays of this invention remove by sorption organic substances from aqueous media. The removal is believed to be accomplished by a partitioning mechanism. In general, the less soluble the organic substance, the more thereof can be removed under fixed contacting conditions.

The amount of such organic contaminants so removed is greater than the amount that can be removed with a corresponding comparable unmodified clay (such as a corresponding starting clay).

Other and further objects, aims, purposes, applications, features, advantages, embodiments and the like will be apparent to those skilled in the art from the present written disclosure and the accompanying drawings.

BRIEF DESCRIPTION OF THE DRAWINGS

In the drawings:

FIG. 1 is a diagrammatic representation of a silane-modified clay particle of this invention showing the probable structure of the bond existing at the particle surface between

Figure 2:
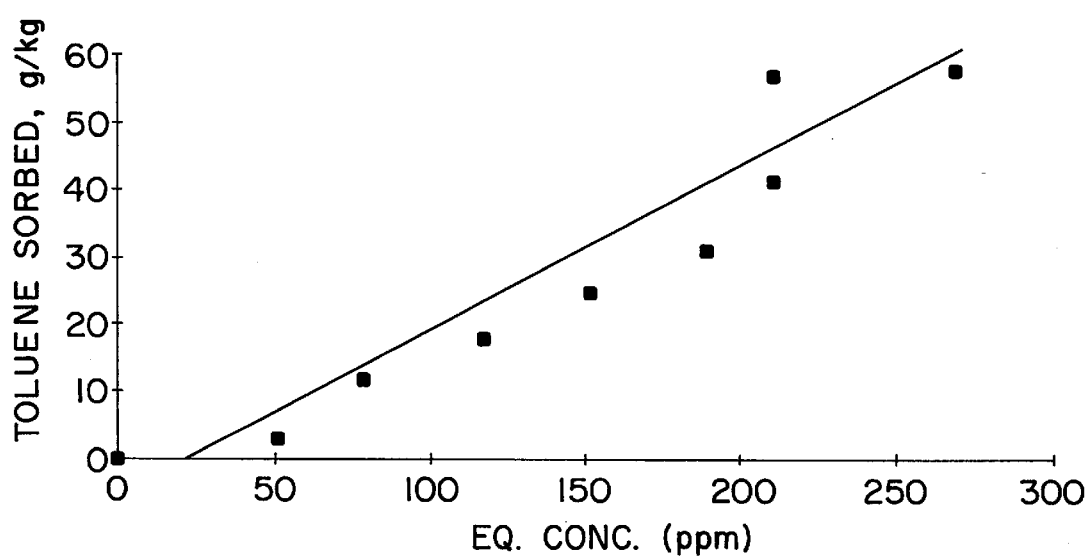
Figure 3:
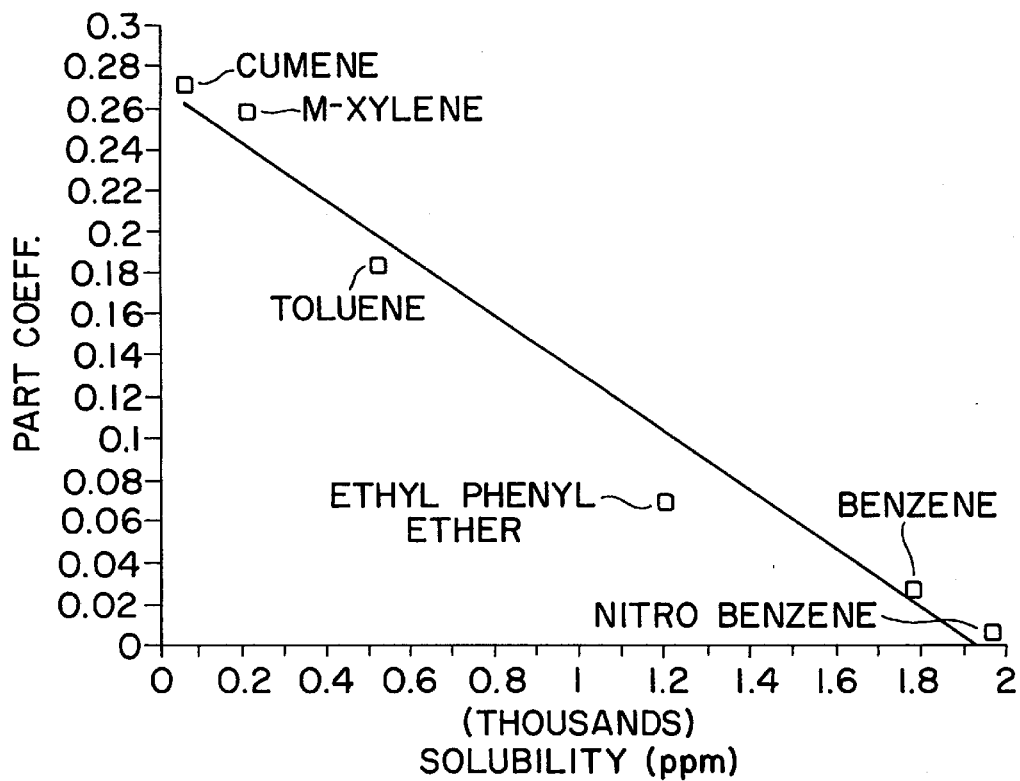

groups of the clay particle surface and the attached R-silyl groups that result, in accord with the practice of this invention, after the starting clay particle has been reacted with a R-substituted halosilane compound as taught herein;

FIG. 2 is a representative and illustrative sorption isotherm showing the relationship between equilibrium concentration as abscissa versus grams per kilogram as ordinate of sorbed toluene that is being removed from an aqueous medium using a silane-modified clay of this invention;

FIG. 3 is a representative and illustrative plot showing the relationship between water solubility as abscissa versus the sorption partition coefficient as ordinate for a silane-modified clay of this invention in the presence of aqueous media containing nitrobenzene, benzene, ethylphenyl ether, toluene, m-xylene and cumene.

Figure 4:
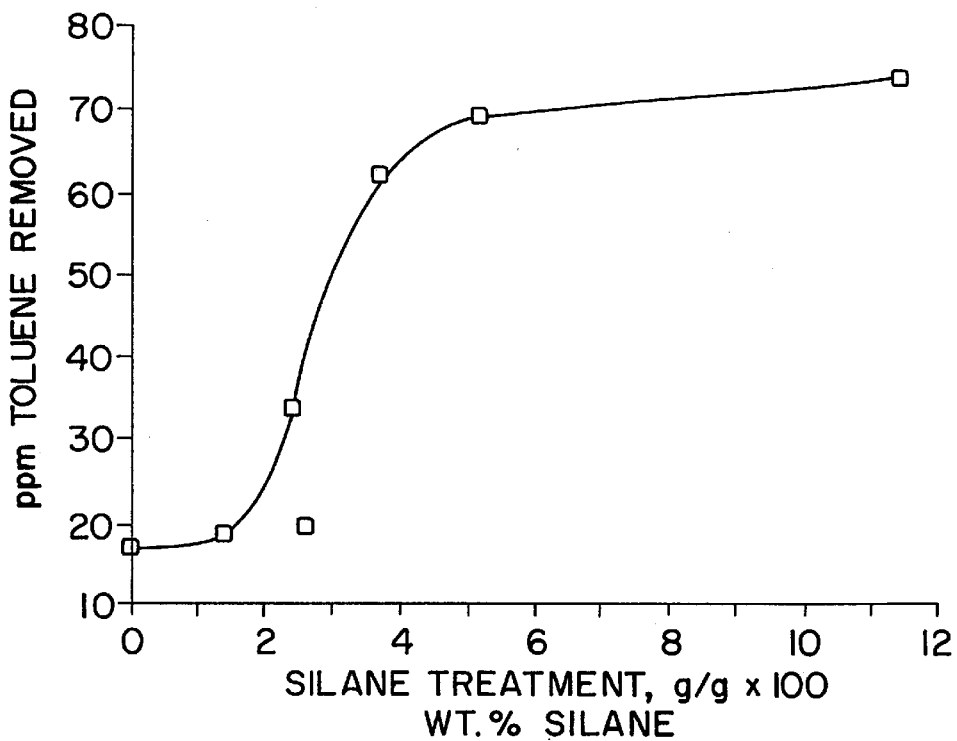
Figure 5:
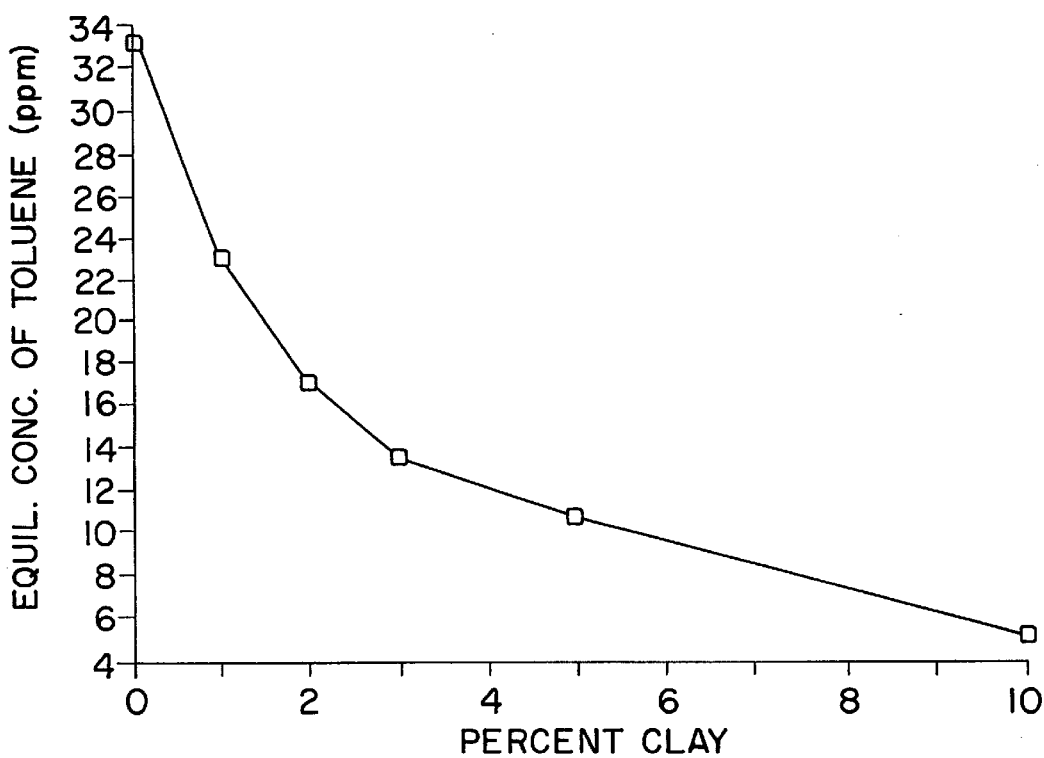
Figure 6:
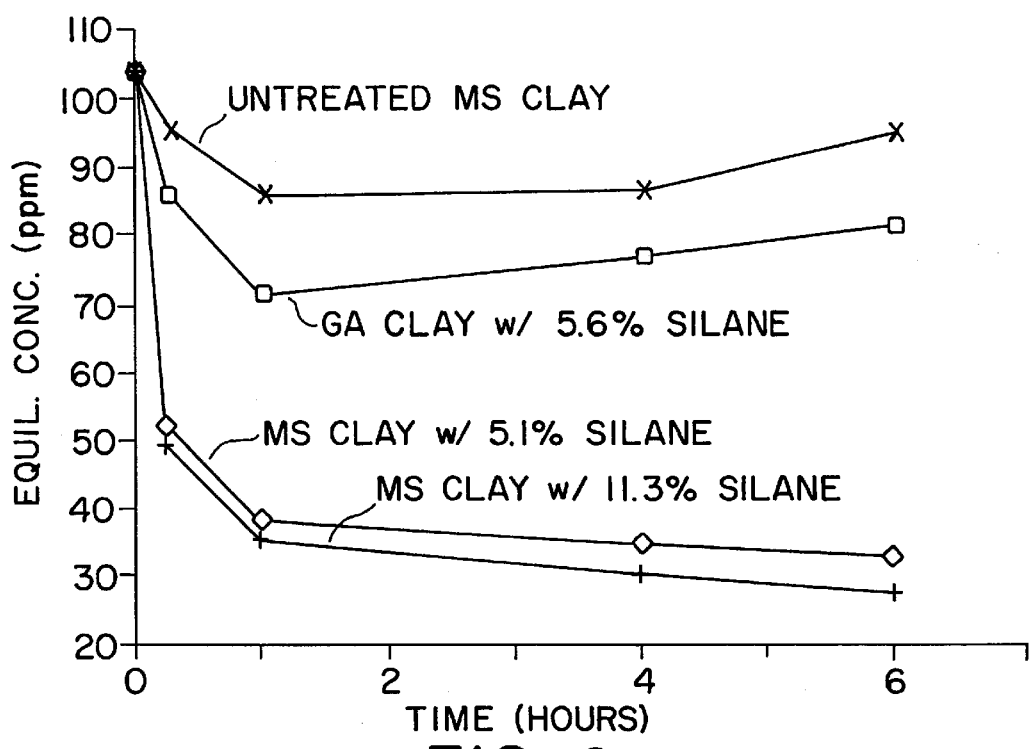

FIG. 4 is a representative and illustrative plot showing the relationship between extent of silane surface modification of clay as abscissa versus amount of toluene removed from an aqueous medium (with the concentration of toluene in the medium being substantially constant) as ordinate;

FIG. 5 is a representative and illustrative plot showing the relationship between weight percent of silane-modified clay as abscissa versus the equilibrium concentration of toluene; and FIG. 6 is a representative and illustrative plot showing the relationship between time as abscissa and equilibrium concentration as ordinate for various concentrations of toluene, showing the effect of time on sorption for a given amount of a silane treated clay of this invention.

DETAILED DESCRIPTION OF PREFERRED EMBODIMENTS

(a) Starting Materials

Clay is the major component of clay minerals. By the term "clay" as used herein reference is had to a member of the group consisting of finely crystalline, irregularly shaped, hydrated aluminum silicates that are characterized by the generalized formula $$Al_2O_3SiO_2 \cdot xHOH \tag{1}$$

Common clay minerals include kaolinite, montmorillonite, attapulgite, smectite, illite, bentonite, halloysite, vermiculite, sepiolite and the like. The sodium and calcium bentonites are largely composed of montmorillonite, but can also contain beidellite, attapulgite and similar minerals.

Clay is insoluble in water and organic solvents. In some liquids, some clays, such as sodium bentonite, form a thixotropic gel. Clay crystals are considered to have surface silyl atoms many of which are bound to surface hydroxyl groups that outwardly project from the crystal surface.

A starting clay that is employed in the practice of the present invention should have a volatile matter content of no more than about 15 percent and a porosity of at least about 0.3 milliliters per gram. Preferably, a starting clay has a particle size below about 850 microns ($\mu$). To achieve such properties in a starting clay, a naturally occurring clay mineral is typically preliminarily processed in ways known well to the art to effect a separation of the naturally occurring clay from any naturally occurring (or associated) contaminants including volatile materials such as organic matter and water. Typically, such processing may involve (1) heat treatment (calcining or the like) and/or (2) water washing (to remove small adherent particles), followed by drying (for example, at about 160° C. for at least about 12 hours). Suitable starting clays for use in this invention are available commercially.

Illustrative presently preferred and more preferred characteristics of a starting clay are summarized in Table I, below.

TABLE I

Starting Clay Property Preferences

| Starting Clay Property | Overall Range | Preferred Range |
|---|---|---|
| Non-slaking[1] | yes | yes |
| Low volatile material content[2] | 0–15 wt. % | 0–4 wt. % |
| Particle size[3] | 5–5,000$\mu$ | 250–850$\mu$ |
| Surface area[4] (B.E.T.) | 25–250 m$^2$/g | about 100 m$^2$/g |
| Porosity[5] | 0.3–1.5 ml/g | about 0.8–0.9 ml/g |
| Average Pore Diameter[6] | 25–150 Å | about 100 Å |

Table I Footnotes:
[1]The term "non-slaking" as used herein has reference to the fact that a starting particulate clay when dried and then saturated with water does not break up, crumble, or disintegrate.
[2]The term "low volatile material" (abbreviated LVM) or the term "volatile matter content" as used herein is measured as weight loss at 1000° C. and is expressed in percent by weight.
[3]The term "particle size" as used herein is measured using the U.S. Standard Screen Series (ASTM Specification E-11-70 values). A plus sign (+) designates retention, and a minus sign (−) designates passage through, a particular screen having a specified size of apertures. U.S. Sieve Series designation for particles passing through a 850$\mu$ sieve and being retained on a 250$\mu$ sieve is −20/+60 or 20/60.
[4]The term "B.E.T. surface area" in square meters per gram (m$^2$/g) refers to the nitrogen Brunauer-Emmett-Teller surface area method described in Brunauer et al., J. Am. Chem. Soc. 60:309 (1938).

TABLE I-continued

Starting Clay Property Preferences

| Starting Clay Property | Overall Range | Preferred Range |
|---|---|---|

[5]The term "porosity" as used herein is measured by the nitrogen Brunauer-Emmett-Teller method described in the aforementioned Brunauer et al. article and is expressed in milliliters per gram (ml/g).
[6]The term "average pore diameter" (APD) as used herein is expressed in angstroms (Å) and is calculated in accordance with the equation set forth below which assumes model pores to be of cylindrical geometry:

$$APD = \frac{40{,}000 \times (\text{Porosity in ml/gram})}{(\text{Surface Area in m}^2/\text{gram})}$$

Presently, the most preferred starting clays are (a) an attapulgite/smectite clay from south Georgia having a low volatile matter (LVM) content (sometimes herein referred to as the LVM-GA clay), and (b) a calcium montmorillonite LVM clay from northeast Mississippi (sometimes herein referred to as the LVM-MS clay). Both clays are obtainable commercially from the Oil-Dri Corporation of Chicago, Ill., and have a porosity of about 0.8 to about 0.9 ml/g, an average pore diameter of about 100 Å, and a particle size in the range of about −850 $\mu$ sieve to about +250 $\mu$ sieve. The surface area of the LVM-GA clay is about 113 m$^2$/gram and of the LVM-MS clay is about 94 m$^2$/gram.

The halosilane compounds employed as starting materials in the practice of the present invention are represented by the following generic formula:

(2)

where:
X is a halogen, preferably chloride, R is a hydrophobic group containing up to 30 carbon atoms and can be alkyl, aryl, alkaryl, cycloalkyl, alkenyl, alkynyl, cycloalkenyl, cycloalkynyl, alkenylaryl and alkynylaryl.

Presently preferred are alkyl groups that contain at least about 10 carbon atoms each, more preferred are alkyl groups that contain about 14 to about 22 carbon atoms each. Mixtures of alkyl groups are also contemplated, e.g., relatively long chain alkyl groups in combination with relatively short chain alkyl groups. For example, a mixture of $C_{10}$ silanes and $C_{18}$ silanes in a 1:2 mole ratio can be used to make the present R-silyl substituted clays of this invention.

Any acyclic or cyclic tertiary amine that forms chloride salt when dissolved in a polar solvent containing chloride ions can be used in the practice of one embodiment of the process of this invention. Presently preferred such amines include pyridine, trimethylamine, imidazole, 2,6-lutidine, 2,4-lutidine and the like.

Any convenient organic polar solvent can be used in the practice of the process of this invention. A polar solvent is a liquid which is substantially non-reactive with the solute therein. In such a solvent, the positive and negative charges are permanently separated (as distinct from nonpolar molecules in which the charges coincide). Presently preferred polar solvents include dichloromethane and acetonitrile.

(b) Process of Preparation

A starting clay (as above characterized) is contacted in an organic polar solvent in the presence of a Formula (2) compound, where X is Cl, and an acyclic or cyclic tertiary amine salt forming catalyst.

Prior to contacting, a starting clay is preferably water washed and then dried. A convenient and presently preferred drying temperature is about 160° C. applied for a time of at least about 12 hours (e.g., overnight) using a kiln, a circulating air oven, or the like.

Batch or continuous contacting conditions can be used, as desired. The tertiary amine is preliminarily dissolved in the polar solvent after which the starting clay is dispersed in the obtained solution, preferably with gentle agitation and at an elevated temperature under liquid phase conditions. A present preference is to heat an agitated batch dispersion to reflux conditions.

Contacting time can vary, but usually is in the range of about two to about six hours.

Process parameters are summarized in Table II, below.

TABLE II

Process Parameters

| Variable | Broad Range | Preferred Range |
| --- | --- | --- |
| weight ratio of silane to clay (in milligrams per gram) | 1–14 | 4–7 |
| mole ratio of tertiary amine to silane | 1–3 | 1.5–2.5 |
| concentration of silane in polar solvent (in grams per milliliter) | 1–20 | 2–5 |
| contacting temperature (°C.) | 25° C. to reflux | reflux |
| contacting time (hours) | about 2 to about 6 hours | about 4 hours |

Figure 1:
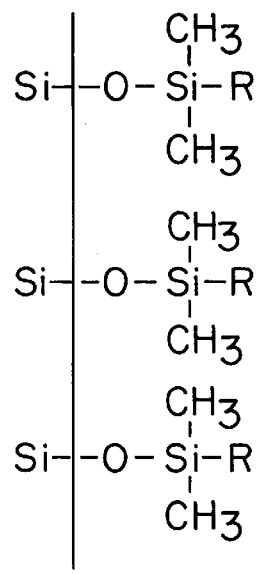

During the contacting, the hydroxyl groups on the clay particle surfaces react with the chlorosilane of Formula (2) to form R-silyl groups on the particle surfaces. The released chloride and hydrogen ions are taken up by the tertiary amine to form a quaternary amine chloride. An illustrative model of a resulting surface modified clay particle is shown in FIG. 1.

In general, the contacting is preferably continued until the extent of clay particle surface silanization is at least sufficient to result in a silanized clay that is hydrophobic as indicated by incomplete surface wetting by water of individual product clay particles.

Infrared (IR) analysis is indicative of the amount of particle surface silanization. Untreated starting clays characteristically show a broad metal-hydroxyl absorption band in the approximate spectral frequency range of 3550 to 3720 $cm^{-1}$. For example, medium to low clay silanization achieved in accord with the teachings of this invention using the preferred LVM-MS starting clay produce clays showing a reduced or lessened band (such a reduced band corresponding to an extent of silanization that is in the range of about 2 to about 5 weight percent based on total silanized clay weight). Highly silanized clay of this invention that is made with the same starting clay shows little or no absorption band at this location. This is typical for a degree of silanization that is greater than about 8 weight percent but less than about 11 weight percent.

Silanization of the LVM-MS clay that is at or above about 5 weight percent (same basis) results in silanized clay particles which display a tendency to float on a water surface.

The silanized clay is separated from the resulting reaction liquid by filtration or centrifugation. To avoid product loss, the filtration is preferably carried out using a filter medium which has a pore size that is smaller than the treated clay particle size. The produced silanized clay particle size is substantially unchanged from the size of the starting clay.

The recovered silanized clay is then preferably washed with an organic polar solvent to remove residual unreacted silane. A presently preferred organic polar solvent for washing is dichloromethane.

Thereafter, the resulting silanized clay product is washed with water to remove preferably all of any residual or remaining salt.

Finally, the solvent washed silanized clay product is dried. One convenient and presently preferred drying procedure uses 110° C. for a period of at least about 12 hours (i.e., overnight). A circulating air oven is presently preferred.

(c) Product Characterization

As indicated above, a particular silanized product clay mass of this invention is comprised of individual particles with surfaces as illustrated in FIG. 1. In the surface R-silyl substituents, the silyl moiety is also dimethyl substituted and connected through a linking —O— to individual Si atoms of the particle surface. R is as above defined in reference to Formula (2).

The silanized products of this invention are characterized by excellent ambient and elevated temperature storage stability.

Presently preferred silanized particulate clay products of this invention are those which are made with the above-indicated preferred starting materials.

(d) Product Usage

The silanized clay products of this invention are useful for removing organic chemical contaminants from water. The absorption mechanism appears to be a partitioning phenomenon with the feature that the less soluble the given organic, the more it is sorbed by a particular inventive clay product.

Those skilled in the art will appreciate that various contacting methods can be employed to decontaminate water using the silanized clay products of this invention.

The outstanding stability characteristics of the silane-modified clays of the invention makes them usable for water decontamination over a wide range of use conditions.

A sorption procedure using a clay product of the present invention is thus conveniently carried out by employing at least one of the following procedures:

First, a filter bed is prepared that is comprised of, or contains, a clay product of this invention. Then, the contaminated aqueous medium is passed through such bed. Residence time of the contaminated aqueous medium in this bed is at least about 30 minutes in order for optimum organic contaminate absorption. Alternatively, an absorption column or powder contacting methods can be utilized as well.

Since the silanized clay products of this invention are inert and substantially non-toxic, they pose minimal safety problems to users. Also, for similar reasons, these products present minimal or substantially no environmental hazards or contamination problems.

After use in sorption, the silane-modified clays of this invention can be treated to remove the sorbed substances and reused for further organic contaminant removal, e.g. by rinsing with methyl chloride or methanol and subsequent drying.

Presently available information indicates that the silanized products of this invention are particularly useful for purposes of clarifying organic liquid contaminated aqueous media wherein the level of contamination is relatively low. By such a clarification, the cost and inconvenience of practicing an alternative clarification procedure such as distillation of the contaminated medium is avoided.

The silane-modified clays of this invention when used as above-indicated are useful in such applications as Gas phase solvent removal and sorption;

Hazardous waste discharges such as occur in: pesticide production, edible oil processing, and deinking recycled paper pulp;

Landfill lining (to deter seepage of environmentally undesirable organic materials);

Precious product recovery;

Solid phase extraction;

Fillers for resins and the like;

Rheology modifiers.

The invention is illustrated by reference to the following Examples:

EXAMPLES 1–9

Silanization

Attapulgite/smectite clay (LVM-GA clay) and calcium montmorillonite clay (LVM-MS clay) aliquots as obtained from Oil-Dri Corporation of America were treated with n-octadecyldimethylchlorosilane (obtained from Hüls America, Bristol, Pa.). The R-silyl group of this particular silane has the structure

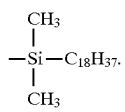

Each clay aliquot was preliminarily water washed to remove any small adherent particles and then dried overnight at 160° C. to remove substantially all bound water.

Either pyridine or trimethylamine was used as the base/catalyst in a 2:1 molar ratio to the silane. Treatments were in various amounts in the range of 0 to about 150 mg silane per gram of clay in 10 g batches. Each batch was refluxed for four hours in a solvent. The solvent was either dichloromethane or acetonitrile. Each product silanized clay was then filtered and washed with dichloromethane to remove unreacted silane followed by washing with water to remove any salt remaining. Each resulting product was dried overnight at 110° C. The extent of silane reaction with each clay was quantified gravimetrically.

The variables in the individual Examples are summarized in Table III, below.

IR analysis showed that, in our silanized products, the clay surface was, in fact, silanized. While untreated clays showed a broad metal-OH stretch at 3550–3720 cm$^{-1}$, highly silanized (up to 11% by weight) clays showed little or no band at that location and C—H stretching. Medium or low silanization (2–5%) showed a lessened but still present metal-OH stretch. The silanized clay granule behavior in water was also indicative of the degree of silanization. For the LVM-MS clay, incomplete surface wetting began to be observed with about 5% wt/wt silane treatment. At or above this level, the treated clay granules showed a tendency to float on water. When a large excess of silane was used to treat the clays (an excess of 29% by weight), it was found that the LVM-GA clay retained about 5.6% wt/wt and the LVM-MS clay about 11.3% wt/wt, see Table IV, below.

TABLE IV

| | Clay Treatment Levels | | |
|---|---|---|---|
| Clay | wt. % Silane | Surface Area, m$^2$/g | % Coverage[3] |
| LVM-GA | 5.56 | 112.7 | 38.2 |
| LVM-MS | 11.3 | 94.2 | 93.3 |

[3]Assumes a $C_{18}$ chain extending away from surface of the molecule covers 51.1A$^2$. This also assumes a chain extending horizontally covers 1824A$^2$.

Sorption Isotherms

Two types of sorption isotherms were conducted, both at room temperature. The first type of isotherm varied the concentration of organic compound while keeping clay concentration constant. In these measurements, 0.04 g clay (LVM-MS) were placed in each of 3-dram (14 ml) vials. To this was added 10 ml of water containing various concentrations of dissolved organic material. The second method varied the clay quantity while keeping the aqueous organic concentration constant. Clay samples (0.1–1.0 g) were placed in 3-dram vials and 10 ml of an aqueous organic solution added.

The clay/aqueous mixture for both methods were sealed in the vials with foil-lined caps and agitated at 180 r.p.m. on an Emdeco Rotator (Electromechanical Development Company, Houston, Tex.) at room temperature. Preliminary analysis by UV/VIS showed sorption to be nearly complete after 1 hour. Samples were removed after 2 hours, and the clay granules allowed to settle. Supernatant was withdrawn and the concentration of remaining organic compound determined by interpolation from a standard curve in the UV with

TABLE III

Example Variables

| | Example No. | | | | | | | | |
|---|---|---|---|---|---|---|---|---|---|
| Variable | 1 | 2 | 3 | 4 | 5 | 6 | 7 | 8 | 9 |
| Clay (LVM-MS) | 10 g | 10 g | 10 g | 10 g | 10 g | 10 g | 10 g | 10 g | 10 g |
| Amine catalyst | pyrid[3] | pyrid[3] | pyrid[3] | pyrid[3] | pyrid[3] | pyrid[3] | TEA[1] | TEA[1] | TEA[1] |
| Solvent | CH$_2$Cl$_2$ 100 ml | CH$_2$Cl$_2$ 100 ml | CH$_2$Cl$_2$ 100 ml | ACN[2] 100 ml | ACN[2] 100 ml | ACN[2] 100 ml | ACN[2] 100 ml | ACN[2] 100 ml | ACN[2] 100 ml |
| Concentration of silane in solvent (grams per liter) | 15 | 10 | 6 | 14 | 10 | 6 | 14 | 10 | 6 |
| Ratio of C$_{18}$ silane to clay (in milligrams per gram) | 150 | 100 | 60 | 140 | 100 | 60 | 140 | 100 | 60 |
| Mole ratio of amine to clay | 2 | 2 | 2 | 2 | 2 | 2 | 2 | 2 | 2 |
| Alkylsilanization, wt. % | 2.7 | 2.7 | 2.0 | 5.3 | 3.8 | 2.3 | 2.4 | 2.0 | 1.6 |

[1]triethylamine
[2]acetonitrile
[3]pyrid = pyridine a Hewlett Packard 8452A diode array spectrophotometer. Water free of organic contaminants provided a baseline control and one organic level with no clay provided as a "positive" control to assure that no organic loss to the atmosphere occurred.

The organic chemicals that were thus evaluated were nitrobenzene, benzene, toluene, m-xylene, cumene (isopropyl benzene), and ethyl phenyl ether. All chemicals were reagent grade. Sorption isotherms were conducted in a series of concentrations in the range of 0–1500 ppm for nitrobenzene, 0–1300 ppm for benzene, 0–500 ppm for toluene, 0–150 ppm for m-xylene, and 0–40 ppm for cumene.

The compositions and procedures employed for each Example are summarized in Tables V–X, below.

TABLE V

Nitrobenzene Sorption Isotherm
0.4% Clay 1B (7.44% Silane), 2 Hrs.

| Solution, ppm (T = 0) | Eq. conc'n in sol'n, ppm | Sorption, g/kg |
|---|---|---|
| 1500 | 1464 ± 97.5 | 9.0 |
| 1200 | 1188 ± 137 | 3.0 |
| 900 | 887 ± 58.5 | 3.2 |
| 600 | 604 ± 69.7 | 0.0 |
| 300 | 302 ± 43.0 | 0.0 |
| 100 | 97.0 ± 18.1 | 0.75 |
| 62.5 | 61.0 ± 7.04 | 0.38 |
| 0.0 | 0.0 ± 0.0 | 0.0 |

TABLE VI

Benzene Sorption Isotherm
0.4% Clay 1B (7.44% Silane), 2 Hrs.

| Solution, ppm (T = 0) | Eq. conc'n in sol'n, ppm | Sorption, g/kg |
|---|---|---|
| 1137.5 | 1103.0 ± 127 | 8.62 |
| 975.0 | 1024.0 ± 118 | 0.0 |
| 812.5 | 775.0 ± 89.4 | 9.37 |
| 650.0 | 655.0 ± 75.6 | 0.0 |
| 487.5 | 496.8 ± 57.3 | 0.0 |
| 325.0 | 295.0 ± 34.0 | 7.50 |
| 162.5 | 149.0 ± 17.2 | 3.38 |
| 0.0 | 0.0 ± 0.0 | 0.0 |

TABLE VII

Toluene Sorption Isotherm
0.4% Sorbent, Clay 1B (7.44% Silane), 2 Hrs.

| Solution, ppm (T = 0) | Eq. conc'n in sol'n, ppm | Sorption, g/kg |
|---|---|---|
| 500.0 | 269.2 ± 31.8 | 57.7 |
| 437.5 | 210.5 ± 90.7 | 56.8 |
| 375.0 | 210.5 ± 24.6 | 41.1 |
| 312.5 | 189.2 ± 14.9 | 30.8 |
| 250.0 | 151.6 ± 13.6 | 24.6 |
| 187.5 | 117.0 ± 9.94 | 17.6 |
| 125.0 | 78.3 ± 6.66 | 11.7 |
| 62.5 | 50.9 ± 4.33 | 2.9 |
| 0.0 | 0.0 ± 0.0 | 0.0 |

TABLE VIII m-Xylene Sorption Isotherm
0.4% Sorbent, Clay 1B (7.44% Silane), 2 Hrs.

| Solution, ppm (T = 0) | Eq. conc'n in sol'n, ppm | Sorption, g/kg |
|---|---|---|
| 150.0 | 76.8 ± 6.14 | 18.3 |
| 125.0 | 56.1 ± 4.49 | 17.2 |
| 100.0 | 51.4 ± 3.60 | 12.2 |
| 75.0 | 41.0 ± 2.87 | 8.5 |
| 62.5 | 36.1 ± 2.53 | 6.6 |
| 50.0 | 27.8 ± 1.95 | 5.6 |
| 25.0 | 13.4 ± 0.938 | 2.9 |
| 0.0 | 0.0 ± 0.0 | 0.0 |

TABLE IX

Cumene Sorption Isotherm
0.4% Clay 1B (7.44% Silane), 2 Hrs.

| Solution, ppm (T = 0) | Eq. conc'n in sol'n, ppm | Sorption, g/kg |
|---|---|---|
| 40 | 19.5 ± 0.780 | 5.12 |
| 32 | 14.5 ± 0.580 | 4.38 |
| 24 | 10.9 ± 0.436 | 3.28 |
| 16 | 7.19 ± 0.288 | 2.20 |
| 8 | 3.65 ± 0.146 | 1.09 |
| 0 | 0.00 ± 0.0 | 0.00 |

TABLE X

Ethyl Phenyl Ether Sorption Isotherm
0.4% Clay 1B (7.44% Silane), 2 Hrs.

| Solution, ppm (T = 0) | Eq. conc'n in sol'n, ppm | Sorption, g/kg |
|---|---|---|
| 500 | 388.8 ± 50.0 | 27.8 |
| 400 | 318.8 ± 38.0 | 20.3 |
| 300 | 245.6 ± 22.3 | 13.6 |
| 200 | 164.0 ± 12.3 | 9.0 |
| 100 | 83.3 ± 6.5 | 4.2 |
| 50 | 40.0 ± 2.1 | 2.5 |
| 20 | 15.0 ± 1.1 | 1.2 |
| 0 | 0.0 ± 0.0 | 0.0 |

These sorption evaluations indicate that all of the resulting sorption isotherms corresponded to the linear equation:

$$x/m = kc \quad (3)$$

where $x/m$ is the amount of material sorbed per unit mass clay (mg/kg), $c$ is the equilibrium concentration (mg/l) and $k$ is the sorption coefficient.

Typical and representative isotherms are illustrated in FIGS. 2 and 5 which show the results for toluene. In FIG. 2, the slope, $k$, of the isotherm plot indicates the degree of sorption, or preference, for the sorbed species by the silane-modified clay. The linearity of the FIG. 2 plot indicates a partitioning mechanism as opposed to an adsorptive process.

If partitioning is, in fact, the controlling sorption mechanism, then one expects $k$ values to increase as water solubility decreases. To evaluate this possibility, a series of six compounds of varying water solubility were investigated. The resulting data, when shown as plot of $k$ values vs. water solubility as shown in FIG. 3, resulted in a straight line with a coefficient of correlation (R-value) of 0.987, thereby confirming the existence of a partition mechanism.

FIG. 4 shows the effect of varying (i.e., increasing) the silane content of the treated (silanized) clay of this invention. Surprisingly, sorption does not increase much until about a 2 wt. % silane loading level is reached. After about 5 wt. % level little further benefit is gained.

To further evaluate the performance of the present silane-treated clays, these clays were added to solutions containing a known amount of contaminant such as toluene. Predetermined amounts of 24/48 LVM-MS clay were added to 10-ml aliquots of water containing 33 ppm toluene. The resulting admixtures were then shaken for about 2 hours and then analyzed. The observed results are shown in FIG. 5.

To ascertain the effect of time on the performance of the present silane-treated clays, to 10-ml aliquots of water containing 104 ppm toluene was added about 3 wt. % of LVM-MS clay or LVM-GA clay, and the resulting admixtures were shaken and analyzed after 30 minutes, 1 hour, 4 hours and 6 hours. The observed results are shown in FIG. 6.

Absorbent clays such as 24/48 LVM-MS and 24/48 LVM-GA that have been surface-treated with octadecylsilane groups exhibit relatively high surface area, relatively high porosity and durability, which makes such clays preferred for aqueous filtration. Such surface-treated clays are able to sorb organics from aqueous solution to a far greater extent than untreated clay. The sorption is achieved by a partition mechanism, thus the less soluble the organic chemical, the more the sorption by the treated silanized clay.

Other and further embodiments within the spirit and scope of this invention will be apparent to those skilled in the art. No undue limitations are to be inferred from the foregoing specification.

What is claimed is:

1. A process for removing an organic compound contaminant from an aqueous medium contaminated with said organic compound comprising contacting said aqueous medium under conditions effective to remove said organic contaminant with a particulate silane-modified clay having a volatile matter content of no more than about 15 percent and a porosity of at least about 0.3 milliliters per gram;

said silane modified clay having R-silyl groups bonded to the surface of the particular clay in an amount sufficient to render the particulate clay hydrophobic, and the R being a hydrophobic hydrocarbon group containing up to 30 carbon atoms.

2. The process of claim 1 wherein R is selected from the group consisting of alkyl, aryl, alkaryl, cycloalkyl, alkenyl, alkynyl, cycloalkenyl, cycloalkynyl, alkenylaryl and alkynylaryl and mixtures thereof.

3. The process of claim 1 wherein R is an alkyl group containing 18 carbon atoms.

4. The process of claim 1 wherein said R-silyl group has the structure:

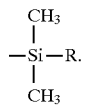

5. The process of claim 1 wherein said clay has a particle size of not greater than about 850 microns.

6. The process of claim 1 wherein the amount of said R-silyl groups present on the clay is at least about 2 weight percent, based on the total weight of said silane-modified clay.

7. The process of claim 1 wherein the amount of said R-silyl groups present is in the range of about 3 to about 11 weight percent based on total weight of said silane modified clay.

8. The process of claim 1 wherein said clay is an attapulgite/smectite having a volatile material content of no more than about 4 weight percent, a B.E.T. surface area of about 113 m²/g, a porosity of about 0.8 to 0.9 ml/g, an average pore diameter of about 100 Å, and a particle size in the range of about 250 μ to about 850 μ.

9. The process of claim 1 wherein said clay is a calcium montmorillonite having a volatile material content of no more than about 4 weight percent, a B.E.T. surface area of about 94 m²/g, a porosity of about 0.8 to 0.9 ml/g, an average pore diameter of about 100 Å, and a particle size in the range of about 250 μ to about 850 μ.

10. The process of claim 1 wherein said R-silyl group has the structure:

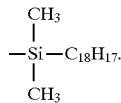

* * * * *